E. SZARVASY.
METHOD FOR PRODUCING PURE RETORT CARBON.
APPLICATION FILED FEB. 12, 1915.
1,199,220.  Patented Sept. 26, 1916.
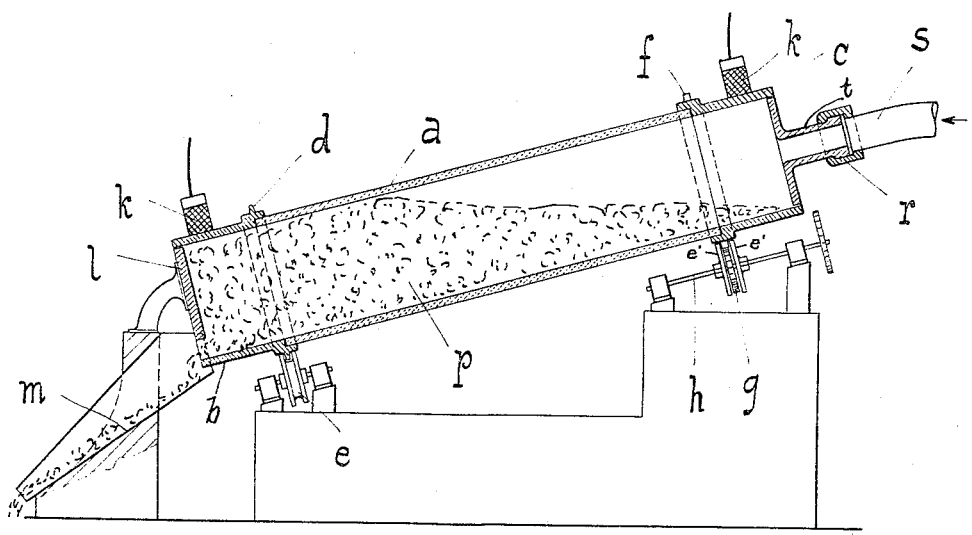
INVENTOR
EMERICH SZARVASY
BY *Ivan Oldeuwel*
ATTORNEY

UNITED STATES PATENT OFFICE.

EMERICH SZARVASY, OF BUDAPEST, AUSTRIA-HUNGARY.

METHOD FOR PRODUCING PURE RETORT-CARBON.

1,199,220.  Specification of Letters Patent.  Patented Sept. 26, 1916.

Application filed February 12, 1915. Serial No. 7,906.

*To all whom it may concern:*

Be it known that I, Dr. EMERICH SZARVASY, a subject of the King of Hungary, residing at Budapest, Austria-Hungary, have invented new and useful Improvements in Methods for Producing Pure Retort-Carbon; and I do hereby declare the following to be a full, clear, and exact description of the same.

It is well known, that methane conducted through a glowing tube decomposes into carbon and hydrogen, giving besides as additional product slight quantities of a naphthaline-like substance. If the experiment is continued a short time, in a tube of small diameter, the carbon deposited will form a hard coating of retort-carbon of very good quality, being very suitable for the manufacturing of electrodes. If however it is attempted to carry out this reaction on a large scale for industrial purposes, great difficulties arise. The carbon coating the inner surface of the tube, acts as heat-insulator and hinders the transmission of the heat necessary for the decomposition and restricts the cross-sectional area of the tube. The temperature of the reaction chamber being thus lowered, the carbon generated deposits no more as dense retort-carbon, but as a soot of bad quality. Also since the carbon deposited on the inner surface of the tube can be removed only by interrupting the process and breaking up the coating, this causes great trouble and a rapid destruction of the tube and impurity of the carbon. If metallic tubes are used, these drawbacks are still heavier, as at the temperatures in question the carbon dissolves in the metal and diminishes its durability. To avoid these drawbacks I do not according to my invention use the walls of the tube as means to convey the heat necessary for decomposition to the gas, but I use for this purpose carbon fragments proceeding from former similar processes. These are introduced into the reaction chamber and heated in any suitable manner these carbon fragments to the necessary temperature. The methane conducted into the reaction chamber will be decomposed substantially on incandescent carbon surfaces and the carbon generated will be deposited to the carbon fragments and not to the wall of the tube. The apparent surface of the carbon fragments filled into the reaction chamber is a multiple of the surface of the tube, but the effective surface of the carbon is again a multiple of its apparent surface. The experiments seem to show, that the carbon fragments have a favorable constant-effect and are much more efficient, than the surfaces of other materials. The carbon forms a dense and strongly adherent deposit on the carbon fragments. The gaseous part of the products of decomposition consists of hydrogen and of a small quantity of vapor of solid hydrocarbon, which may be easily condensed. The carbon-fragments grow gradually and to avoid their being stuck together by the carbon deposited, it is advisable to move continually or periodically the carbon filling. This has the further effect, that the gas flow is compelled to change constantly its direction and will get into more intimate contact with the carbon-fragments. The carbon generated being deposited on the carbon-filling, it is easy to remove the carbon produced without injury of the walls of the tube and without affecting the product. For this purpose the carbon filling is removed continually or periodically from the reaction chamber and is replaced by smaller quantities of smaller fragments of a similar carbon proceeding for instance from former periods of the process. It is obvious, that if we know the quantity of the methane decomposed per hour, it may be easily determined how much carbon should be supplied at the one end of the decomposing chamber and how much carbon must be removed at the other end of the decomposing chamber to secure a constant carbon-load in the chamber and the constancy of its cross section and other working conditions. As the carbon-fragments on which the newly generated carbon is deposited, proceed from former periods of the process, it is obvious, that the product will be completely homogeneous and free of ashes and contain 99.9% of carbon.

Any suitable contrivance can be used to move the carbon-filling. If a substantially horizontal tube-furnace is used as decomposing chamber, the stirring of the carbon can be effected by slow rotation of the furnace; this rotation can be used at the same time to convey the carbon filling gradually from the supply end toward the discharge end of the tube. However the decomposing chamber can be constructed in any suitable manner.

The decomposition of the methane requiring considerable heat, and the conveying of the heat through the walls of the decomposing chamber having besides the drawbacks aforementioned, a very low efficiency, it is advisable to heat the carbon filling directly. For this purpose electric resistance heating may be used in first line in such a manner, that the moving carbon filling itself forms the heating resistance between electrodes projecting into the decomposing chamber. The hydrogen leaving the furnace with high temperature can be used to heat the methane before its introduction to the decomposing chamber, so that the current consumed has to supply only the heat necessary for the decomposition.

The inclosed drawing shows a diagrammatically longitudinal section of an apparatus for the performance of my process.

In the drawing —a— is a tube of heat resisting insulating material provided with metallic headpieces —b— and —c—. The tube —a— is rotatably journaled on rollers —e— by means of rims —a— and —f—. Rim —f— meshes with gear —g— mounted on axle —h— driven in a suitable manner by contact brushes —k— and sliding on the metallic headpieces —b— and —c— for feeding the heating current. The upper opening of the mouth of the tube is closed by a plate having a tubular extension —t— of a smaller diameter and forms with the stationary sleeve —r— an airtight junction permitting, however, the rotation of the glowing tube —a—. To the sleeve —r— a conduit —s— is connected for the admission of the methane.

—p— designates a carbon charge in the tube —a—.

The lower mouth of the tube —a— is practically closed by a stationary plate —l— leaving only a comparatively small opening for the discharge of the carbon. This discharge-opening is suitably regulated in order to permit the carbon to escape in the same measure as produced in the glowing tube. The carbon discharged from the tube —a— drops onto the slide —m—.

The heat can however be supplied by producing in the decomposing chamber a continual or periodical combustion. The former can be produced by supplying into the decomposing chamber besides the methane (preferably heated) such quantities of oxidizing gases (for instance atmospheric air or oxygen), that the methane is partly burned, generating thereby the heat necessary for the decomposition of the rest of the methane. Instead of methane hydrogen can be burned in the decomposing chamber. The heating and the decomposition may be effected alternatively in different stages. In this case the decomposing chamber is first heated by supplying hydrogen or methane and air, and is used afterward for the decomposition of pure methane. The decomposing chamber becoming cooled during the decomposition, it is again heated, and so on.

With my improved process all the carbon of the methane is gained, while the processes hitherto known allowed only the extraction of a small part of the carbon and in the form of a bad soot.

What I claim is:

1. A process for the manufacture of entirely pure retort carbon by the dissociation of methane, said process consisting in heating to a glowing condition fragments of carbon previously produced by the same process; passing methane thereover, whereby the methane is decomposed, whereby the fragments are increased in size; removing said fragments, and substituting therefor a smaller quantity of smaller pieces resulting from a previous process.

2. A process for the manufacture of entirely pure retort carbon by the dissociation of methane, said process consisting in heating to a glowing condition fragments of carbon previously produced by the same process; passing methane thereover, whereby the methane is decomposed; keeping said fragments moving during the dissociated process, whereby the fragments are increased in size; removing said fragments; and substituting therefor a smaller quantity of smaller pieces resulting from a previous process.

3. A process for the manufacture of entirely pure retort carbon by the dissociation of methane, said process consisting in heating to a glowing condition fragments of carbon previously produced by the same process by passing a fuel gas and air or oxygen over said fragments in amounts corresponding to the amount of heat required; and passing methane thereover, whereby the methane is decomposed.

4. A process for the manufacture of entirely pure retort carbon by the dissociation of methane, said process consisting in heating to a glowing condition fragments of carbon previously produced by the same process alternately by the introduction of hydrogen and a combustion feeding gas; and afterward introducing pure methane.

In testimony whereof, I have signed my name to this specification in the presence of two subscribing witnesses.

DR. EMERICH SZARVASY.

Witnesses:
 EUGENE KERRAN,
 HUGH KEMENY.